March 27, 1951  R. POOLE  2,546,273
APPARATUS FOR DETECTING EXPLOSIVE GASES
Filed Feb. 21, 1944  3 Sheets-Sheet 1

Inventor
R. POOLE
By
Emry Holcombe Blair
Attorneys

March 27, 1951  R. POOLE  2,546,273
APPARATUS FOR DETECTING EXPLOSIVE GASES
Filed Feb. 21, 1944  3 Sheets-Sheet 2

Inventor
R. Poole
By
Emery Holcombe & Blair
Attorneys

March 27, 1951          R. POOLE          2,546,273
APPARATUS FOR DETECTING EXPLOSIVE GASES
Filed Feb. 21, 1944          3 Sheets-Sheet 3
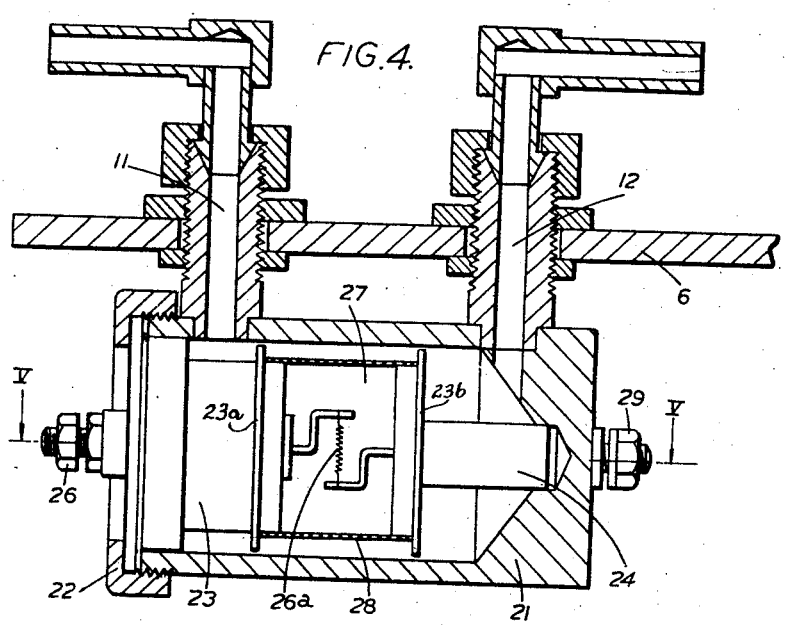
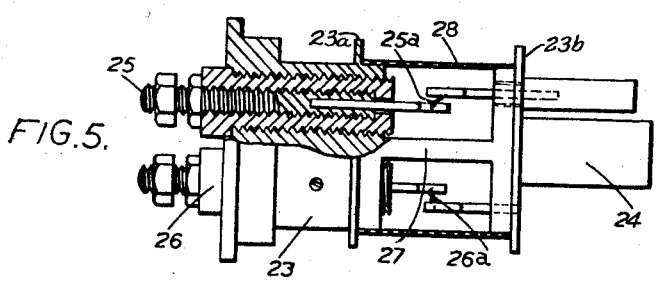
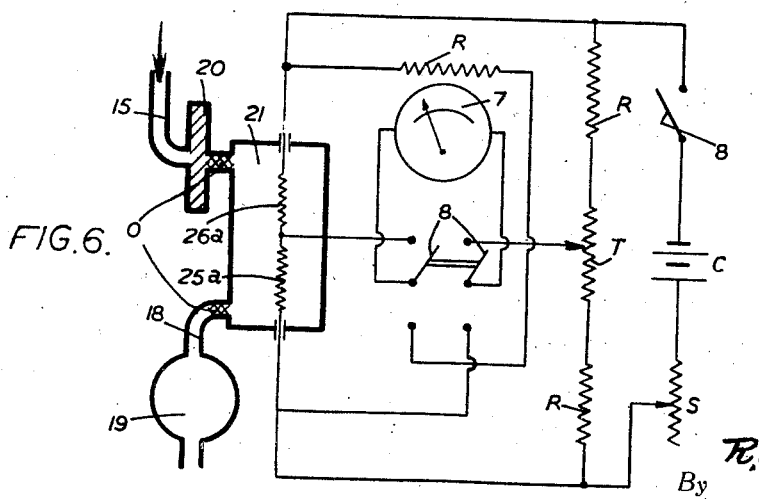
Inventor
R. POOLE
By
Emery Holcombe & Bier
Attorneys Patented Mar. 27, 1951

2,546,273

UNITED STATES PATENT OFFICE 2,546,273

APPARATUS FOR DETECTING EXPLOSIVE GASES

Ralph Poole, London, England

Application February 21, 1944, Serial No. 523,380
In Great Britain February 26, 1943

10 Claims. (Cl. 23—255)

This invention relates to apparatus for detecting explosive gases of the kind in which an explosive gas is caused to pass through a chamber containing an electrically heated filament forming part of a Wheatstone bridge circuit, and maintained at such a temperature that its contact by an explosive gas will raise its temperature; this increase in temperature being proportional to the concentration of the explosive gas. Increases in the temperature of the filament are recorded on an electrical measuring instrument connected across the bridge.

Reference is hereby made to my application Serial No. 765,985, filed on August 4, 1947, which is a continuation in part of this application.

In apparatus of this type a compensating filament is sometimes used having the same coefficient of expansion as the gas-detecting filament but operating at a lower temperature so that its temperature does not rise when exposed to the explosive gas and in existing apparatus the two filaments are housed in separate chambers to which the gas under test is supplied in parallel streams.

With such an arrangement there is a tendency for the temperature of the detector chamber to rise above that of the compensating chamber so that adequate compensation for normal variations in the temperature, pressure and humidity of the atmosphere does not take place and the main object of the present invention is to provide an apparatus which is not open to this defect. Further objects of the invention are to improve and simplify the construction of the apparatus and to provide a general arrangement which can be readily carried to and used on the site of the test.

According to this invention the chambers containing the detector and compensating filaments are formed as a unit from a single piece of material so as to ensure uniform temperature conditions in each chamber. Further this unit is mounted in a single casing so that the gas under test passes uniformly over the unit containing the detecting and compensating filaments without impinging directly upon these filaments.

The whole of the testing apparatus is mounted on a single panel which supports a meter, a single casing forming a gas chamber and containing the twin filament unit above described, a sampling line of suitable length adapted to be fitted to the inlet side of the chamber, and an aspirator connected to the outlet side of the chamber. Means to prevent flash-back are provided in the inlet and outlet tubes and the whole panel is so mounted within a casing that it can assume a horizontal position during the test and be folded so as to occupy a vertical position when not in use. The instrument is conveniently carried by a harness comprising a belt and braces and mounted on the back of the harness is an accumulator to supply the necessary current. The controls are mounted on the panel and include a switch having three positions, a voltage control and a switch for controlling the potentiometer.

Preferably the detector and compensating chambers are milled from a single cylindrical block of metal so as to form two semi-cylindrical slots in which the filaments are supported, a tube or sleeve of thin metal, for example perforated metal foil, surrounding both filaments so as to form two separate semi-cylindrical chambers. The whole unit is then inserted into a gas chamber having a cylindrical bore of larger diameter than the twin chamber unit so that gas can circulate uniformly through each chamber without directly impinging upon the filaments they contain.

One construction according to this invention is illustrated by way of example in the accompanying drawings, in which:

Figure 4 is a sectional elevation on an enlarged scale showing the gas sampling chamber, Figure 5 is a section on the line V—V of Figure 4, Figure 6 is a wiring diagram, and Figure 7 shows how the apparatus is carried when it is in use.

Figure 1:
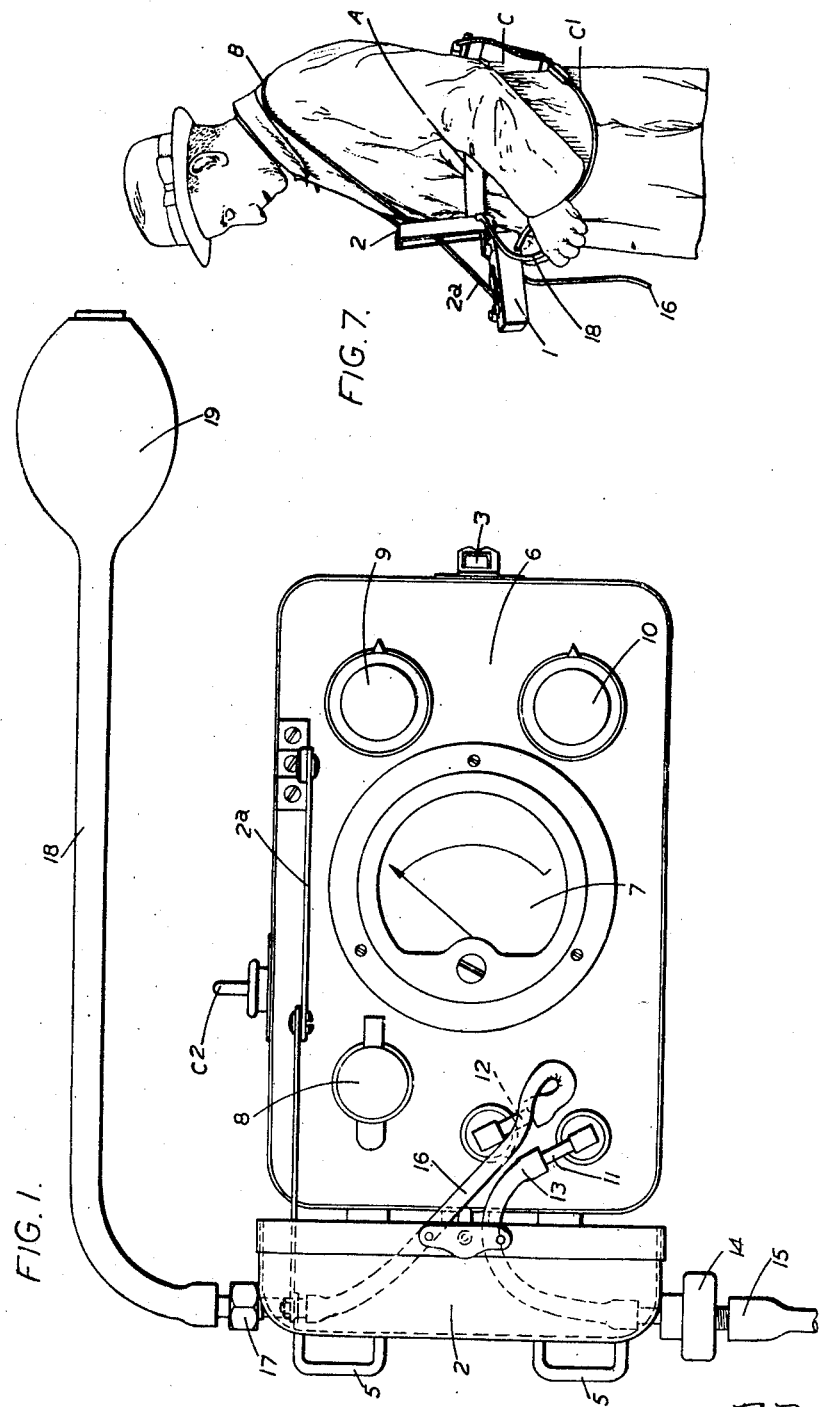
Figure 1 is a plan of the instrument ready for use.
Figure 2:
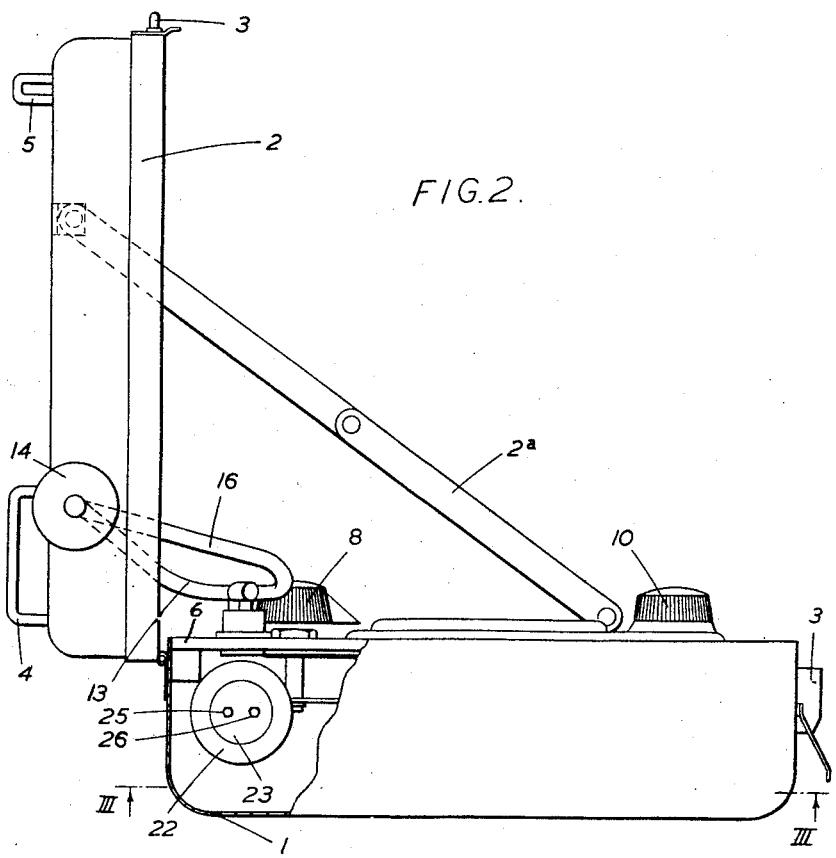
Figure 2 is a side elevation, parts of the casing being broken away.
Figure 3:
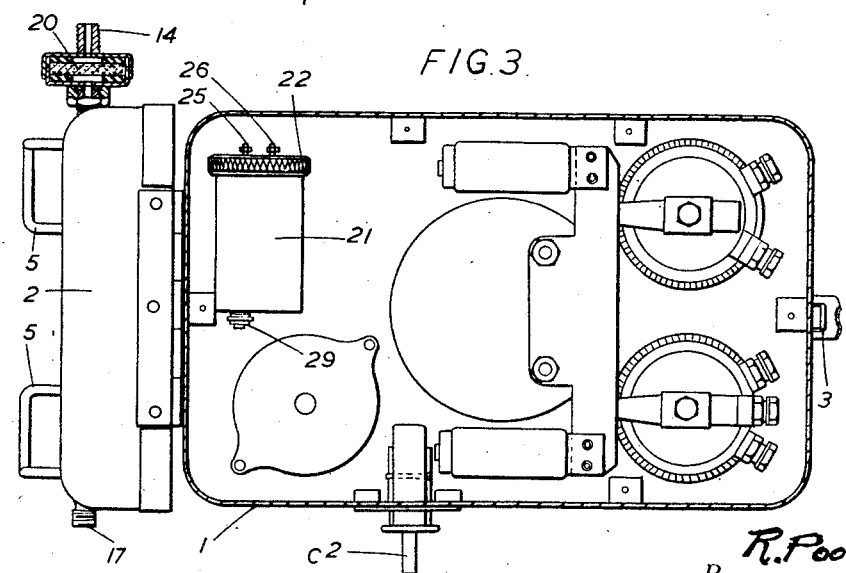
Figure 3 is a section on the line III—III of Figure 2.

The apparatus comprises a casing 1 provided with a flanged hinged lid 2 and a fastening device 3. Formed on the lid are loops 4 through which a waist-belt A is threaded and additional loops 5 through which are passed braces B secured to the waist-belt. A battery or accumulator in a case C is attached to the back of the waist-belt so that the casing can be supported on the operator either to occupy a vertical position when the casing is closed or so that the main part of the casing assumes a horizontal position as shown in Figure 7 when the apparatus is to be used. A link 2a limits the extent to which the main part of the casing can fold downwards relatively to the lid and a flexible cable $C^1$ connects the accumulator to a plug $C^2$ on the casing.

The working parts of the instrument are mounted on the under side of a panel 6 which is supported by the main casing 1. On the upper surface of the panel and in the centre is ammeter 7 also, a three-position switch 8 and control knobs 9 and 10 for adjusting the voltage control and filament balance potentiometer. Adjacent to the switch 8 are the inlet and outlet connections 11 and 12 respectively of the gas-detecting chamber, the inlet being connected by a flexible tube 13 to the union 14 which carries a flexible sampling line 15. The outlet 12 is connected by a flexible tube 16 to the union 17 which carries a flexible tube 18 having at its outer end an aspirator 19. As the unions 14 and 17 are formed on the outer flange of the lid 2 and the tubes 13 and 16 are of short length with sufficient slack, the case can be opened or closed without risk of leakage occurring.

To enable the instrument to be used in a dust-laden atmosphere a filter 20 of porous porcelain or the like is provided within the union 14 and in addition flash-back arresters of wire gauze or the like may be provided both in the inlet union 14 and in the outlet union 17.

Mounted on the under side of the panel and communicating with the inlet 11 and outlet 12 is a cylinder 21 which is externally screwthreaded at one end and provided with a detachable clamping ring 22. This clamping ring retains in position within the cylinder 21 a substantially cylindrical plug unit 23 which is provided at one end with a projecting rod 24 to engage a socket in the closed end of the cylinder. The opposite end of the plug is drilled to receive the terminal 25 of a compensator filament 25a and a similar terminal 26 for the detector filament 26a. These filaments are supported in semi-cylindrical recesses milled out of the solid brass or similar plug 23 so that a central partition 27 separates the two slots. Both the filaments are enclosed in a perforated metal foil or like sleeve 28 so that each filament is enclosed within a semi-cylindrical chamber. The plug 23 is inserted as a single unit into the cylinder 21 and is clamped in position by means of the ring 22, the terminals 25 and 26 being thus exposed at that end of the cylinder and the other end of the cylinder carrying a terminal 29 which makes contact with both the filaments by means of the rod 24. Plug 23 is provided with a circular baffle 23a, positioned between the filament chamber 27 and the inlet 11, leaving a narrow circular slot through which gas from the inlet must pass to enter the filament chamber 27, while a similar circular baffle 23b is provided between chamber 27 and the outlet 12 forming a similar circumferential slot through which the gas leaving the chamber must pass.

The main part of the plug 23 is of smaller diameter than the bore of the cylinder 21 and the gas inlet and outlet connections 11 and 12 are spaced further apart than the ends of the filament-containing chambers. As a result gas can pass through each filament chamber without impinging directly upon the filaments or being admitted so as to bear directly against the thin perforated metal wall of each chamber.

The three-way switch 8 can be set to the "off," "test" or "voltage check" position and in addition the knob 9 can be employed to check the voltage control whilst the other knob 10 controls the filament balance potentiometer.

When the switch 8 is set in the "check" position the meter 7 is connected across the filaments 25a and 26a and in conjunction with the voltage control rheostat sets the voltage to a line indicated on the scale. After the voltage has been set the switch 8 is turned to the "test" position and clean air is drawn through the cylinder 21 with the meter brought to its zero position by means of the potentiometer.

A sample of gas is then drawn through the sampling line 15 by means of the aspirator 19 and flows into the cylinder in which the dual filament unit is housed to form part of the bridge circuit. The detector filament 26a is designed in known manner to operate at a higher temperature than the compensator filament as by making the detector filament short and thin as compared with the compensator filament so that the operating temperature of the detector filament is such that its temperature will rise on its coming into contact with the explosive gas whereas there will be no such reaction between the compensator filament and this gas. Both filaments have the same temperature coefficient. Thus the compensator filament acts to compensate for variations in the temperature, pressure and humidity of the gas being tested but is unaffected by changes in the proportion of explosive gas coming into contact therewith.

As the chambers in which the filaments are supported are machined from a single block of metal and are protected by means of a perforated metal cylinder 28 the risk of a higher temperature within the detector chamber is obviated. Further, although the detector filament has a shorter life than the other compensating filament, in practice it is necessary to replace both filaments when one is destroyed since they must be matched in order that the calibration remains unchanged. With a twin filament unit according to the present invention errors in calibration due to replacement are obviated since both detector and compensator filaments are embodied in a single unit assembly and all such units are matched against a standard in the factory so that replacements can be easily and safely made. Although the terminals 25, 26 are for convenience made detachable it will be seen that this does not affect the behaviour of the filaments which, in effect, are supported in chambers formed from a single block of metal.

In the wiring diagram fixed resistances are indicated at R, voltage control at S, and the filament balance potentiometer at T. The remaining references are similar to those used in the foregoing description and in addition flash-back arresters are diagrammatically shown at O in the ports of the gas chamber 21.

It will be understood that although the invention is particularly applicable to a portable detector mounted in a case adapted to be carried by means of a harness or equipment as above described, the detector and compensating units and the gas chamber in which they are enclosed can if desired be employed in connection with other forms of gas-testing equipment and that constructional details are capable of considerable variation without departing from this invention.

What I claim as my invention and desire to secure by Letters Patent is:

1. Apparatus for detecting explosive gases including in combination a Wheatstone bridge circuit, an electrically heated detector filament, a compensating filament, the filaments having similar temperature coefficients, a common support on which the filaments are mounted adjacent to one another including a common partition which prevents direct radiation of heat from one filament to the other said filaments being exposed for their entire length on either side of said partition to the same stream of gas, a casing enclosing a chamber in which the support carrying the filaments is disposed, means for introducing gas to be tested and a measuring instrument connected across the bridge.

2. Apparatus for detecting explosive gases including in combination the elements set forth in claim 1, in which the support for the filaments is formed from a single piece of metal having recesses in which the two filaments lie and a common wall portion separating said recesses.

3. Apparatus for detecting explosive gases including in combination the elements set forth in claim 1, wherein the filament support comprises a metal plug having recesses cut in its circumferential wall to receive the filaments while leaving a common wall between them, and a perforated metal wall surrounding the plug while the chamber in which the plug is removably mounted has an aperture, through which the plug is removed from and inserted into the chamber normally closed by one end of the plug.

4. Apparatus for detecting explosive gases including in combination a Wheatstone bridge circuit, detector and compensator filaments arranged in the circuit, a common support for the filaments in the form of a cylindrical plug having diametrically opposite recesses in which the filaments are supported in its circumferential wall with a common wall between them, said filaments being symmetrically disposed with respect to said common wall, and a cylindrical perforated wall surrounding the plug so as to enclose the recesses, said filaments being exposed for their entire length within said recesses between said common wall and said cylindrical wall, a substantially cylindrical gas chamber in which the plug is disposed so that one end thereof closes an aperture in one end of the gas chamber through which the plug can be inserted and removed, radially extending flanges on the plug at the ends of the perforated wall extending into close proximity to but not into contact with the wall of the gas chamber and inlet and outlet ports in the gas chamber situated at points outside the flanges so that gas entering and leaving the part of the chamber in which the filaments lie has to pass over these flanges.

5. Apparatus for detecting explosive gases including the elements set forth in claim 4 in which the end of the plug which normally closes the aperture in the casing carries contacts for connecting the filaments to the bridge circuit.

6. Apparatus for detecting explosive gases including a casing providing a chamber having an inlet and an outlet for passing gas to be tested therethrough, said casing having an apertured removable end wall, a plug for the chamber located in the chamber coaxially therewith and held therein by said removable end wall, said plug comprising a coaxial body portion in spaced relation with the interior walls of the chamber, a compensating filament and a detecting filament mounted on said body portion between the inlet and outlet symmetrically arranged with reference to each side of a diameter of the plug, and a partition emanating from said body portion in the plane of said diameter and extending lengthwise of the chamber between the filaments for their full length, said partition being disposed in the medial plane of said inlet and said outlet so that gas entering the chamber passes over both filaments, said filaments having similar temperature coefficients and being arranged in a Wheatstone bridge circuit which includes a measuring instrument connected across the bridge, and said plug carrying contacts projecting through the apertures in the removable end wall, for connecting the filaments into the circuit.

7. Apparatus as defined in claim 6 in which the body portion of the plug includes a radial flange disposed between the filaments and the inlet and a radial flange disposed between the filaments and the outlet whereby a gas entering the chamber is baffled and constrained to flow in contiguity with the interior wall of the chamber before flowing over the filaments.

8. A filament supporting unit for apparatus for detecting explosive gases comprising: a symmetrical plug member having a base adapted to close the end of a gas chamber into which the plug member is inserted, the part of the plug member which is adapted to lie within said chamber being of smaller diameter than the diameter of said base and being formed with two similar recesses lying back-to-back on opposite sides of a partition extending diametrically with regard to the plug, flange-like annular projections on the part of the plug between which the partition extends constituting baffles, and detecting and compensating filaments having similar temperature coefficients supported respectively in the two recesses so as to be disposed symmetrically on opposite sides of said partition.

9. A filament supporting unit as defined in claim 8 including a cylindrical perforated wall extending between the flange-like projections and around the part of the plug in which said recesses are formed.

10. A filament supporting unit as defined in claim 9 in which said base has apertures formed therein for the reception of contacts which project therethrough to electrically connect the filaments in a circuit.

RALPH POOLE.

REFERENCES CITED

The following references are of record in the file of this patent:

UNITED STATES PATENTS

| Number | Name | Date |
|---|---|---|
| 1,333,850 | Kennedy | Mar. 16, 1920 |
| 1,957,341 | Holt | May 1, 1934 |
| 2,023,731 | Johnson et al. | Dec. 10, 1935 |
| 2,053,121 | Vayda | Sept. 1, 1936 |
| 2,080,953 | Rensch | May 18, 1937 |
| 2,099,548 | Vayda et al. | Nov. 16, 1937 |
| 2,149,441 | Jacobson | Mar. 7, 1939 |
| 2,154,862 | Olshevsky | Apr. 18, 1939 |
| 2,197,370 | Sullivan | Apr. 16, 1940 |
| 2,204,966 | Morgan et al. | June 18, 1940 |
| 2,298,288 | Gerrish et al. | Oct. 13, 1942 |
| 2,326,884 | Phelps | Aug. 17, 1943 |
| 2,335,032 | Sullivan | Nov. 23, 1943 |

OTHER REFERENCES

Bulletin DU-1 of Mine Safety Appliances Co., Pittsburgh, Pa., 4 pp.